(12) United States Patent
Guichard et al.

(10) Patent No.: US 7,419,631 B2
(45) Date of Patent: Sep. 2, 2008

(54) MOULDS FOR TRANSFORMING PLASTIC AND COMPOSITE MATERIALS AND RELATED TRANSFORMATION METHOD

(75) Inventors: Alexandre Guichard, Tresserve (FR); Gérard Legerot, Aix les Bains (FR)

(73) Assignee: Roctool, Le Bourget du Lac (FR)

( * ) Notice: Subject to any disclaimer, the term of this patent is extended or adjusted under 35 U.S.C. 154(b) by 438 days.

(21) Appl. No.: 10/415,651

(22) PCT Filed: Nov. 7, 2001

(86) PCT No.: PCT/FR01/03460

§ 371 (c)(1),
(2), (4) Date: Oct. 20, 2003

(87) PCT Pub. No.: WO02/38355

PCT Pub. Date: May 16, 2002

(65) Prior Publication Data

US 2004/0058027 A1 Mar. 25, 2004

(30) Foreign Application Priority Data

Nov. 8, 2000 (FR) .................................. 00 14324

(51) Int. Cl.
*H05B 6/02* (2006.01)
*B29C 35/00* (2006.01)
(52) U.S. Cl. ................................ 264/431; 425/174.8 R
(58) Field of Classification Search ...................... 425/3, 425/174.6, 174.8 E, 174.8 R; 264/402, 403, 264/431; 164/512, 513, 514
See application file for complete search history.

(56) References Cited

U.S. PATENT DOCUMENTS 2,435,866 A * 2/1948 Bilhuber .................. 156/380.8

(Continued)

FOREIGN PATENT DOCUMENTS

DE 19802855 7/1998

(Continued)

OTHER PUBLICATIONS

International Search Report and its Annex (in English and French) mailed on Mar. 8, 2002 and conducted in the International Application No. PCT/FR01/03460.

(Continued)

*Primary Examiner*—Yogendrta Gupta
*Assistant Examiner*—Emmanuel S Luk
(74) *Attorney, Agent, or Firm*—Greenblum & Bernstein, P.L.C.

(57) ABSTRACT

Mold for transforming a material comprising a plastic and/or a composite material, wherein the mold includes a mold body having at least one impression arrangement. A heating arrangement directly heats at least one of the material and an intermediary surface impression arranged adjacent to the material. The at least one impression arrangement includes an insulating material that prevents transfer of calorific energy from the material to the mold body, and vice-versa. The insulating material includes a mineral resin which includes an association of non-organic constituents. An insulating device is arranged one of within the insulating material and between the insulating material and the mold body. This Abstract is not intended to define the invention disclosed in the specification, nor intended to limit the scope of the invention in any way.

37 Claims, 13 Drawing Sheets

U.S. PATENT DOCUMENTS

| | | | | |
|---|---|---|---|---|
| 3,816,586 | A | * | 6/1974 | Goosey ........................ 264/431 |
| 4,225,109 | A | * | 9/1980 | Yotsutsuji et al. ............ 249/111 |
| 4,460,524 | A | * | 7/1984 | Takahashi et al. ............ 264/431 |
| 4,496,131 | A | * | 1/1985 | Yang ............................ 249/78 |
| 4,699,578 | A |   | 10/1987 | Sumner et al. ................ 425/33 |
| 5,032,327 | A |   | 7/1991 | Becheret ...................... 264/489 |
| 5,176,839 | A | * | 1/1993 | Kim ............................. 249/78 |
| 5,338,497 | A | * | 8/1994 | Murray et al. ............... 264/486 |
| 5,483,043 | A | * | 1/1996 | Sturman, Jr. et al. ........ 219/647 |
| 5,591,369 | A | * | 1/1997 | Matsen et al. ................ 219/633 |

FOREIGN PATENT DOCUMENTS

| | | |
|---|---|---|
| EP | 0183450 | 6/1986 |
| EP | 0347299 | 12/1989 |
| FR | 2488185 | 2/1982 |
| GB | 2065022 | 6/1981 |
| JP | 60135230 | 7/1985 |
| JP | 60174624 | 9/1985 |
| JP | 63-78720 | 4/1988 |

OTHER PUBLICATIONS

Patent Abstracts of Japan vol. 010, No. 014.
Patent Abstracts of Japan vol. 012, No. 302.
Patent Abstracts of Japan vol. 009, No. 297.

* cited by examiner

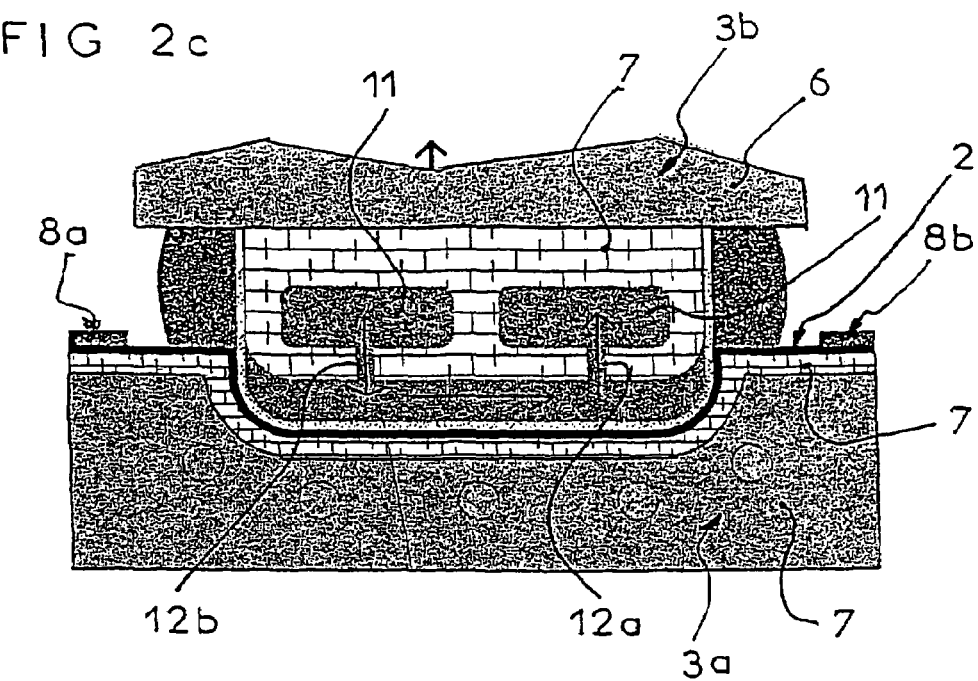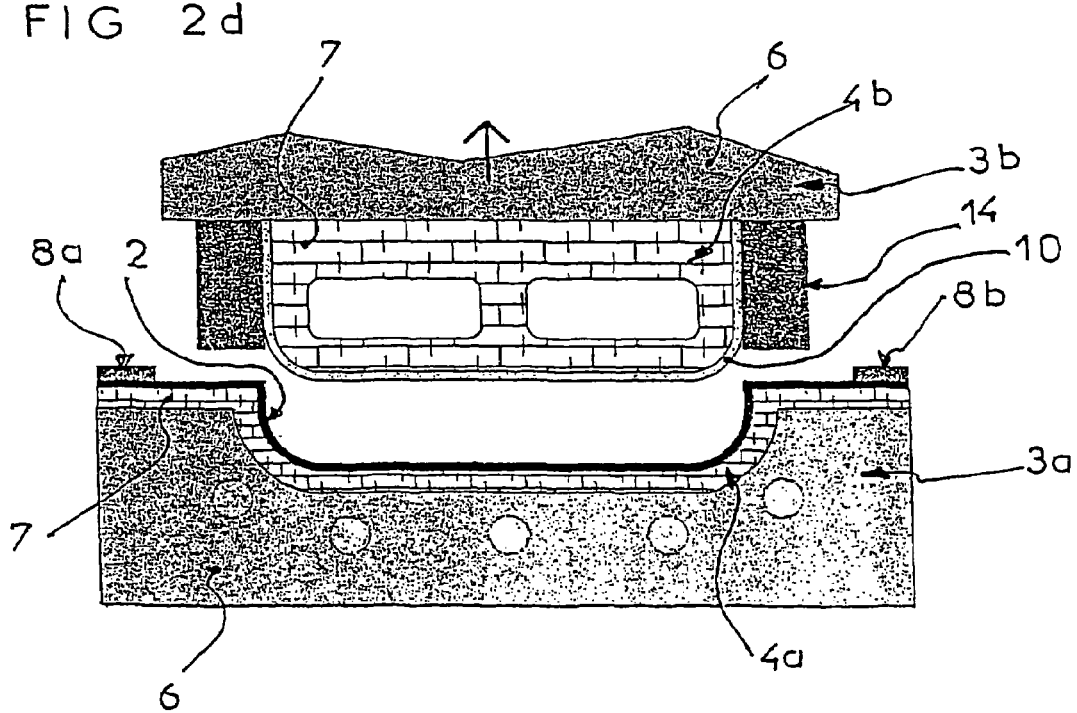

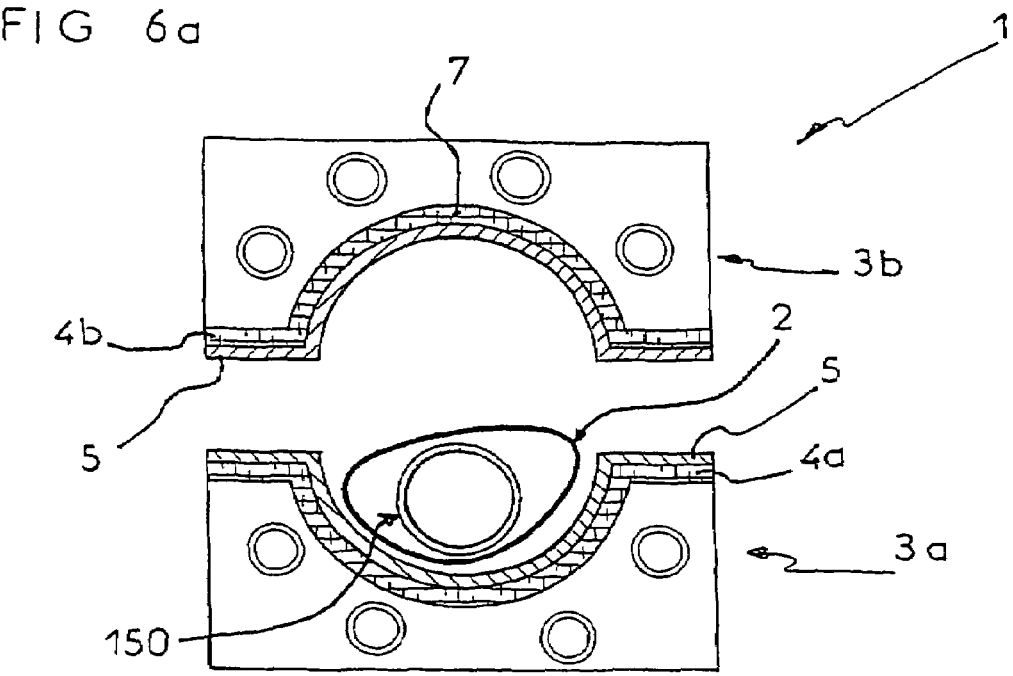
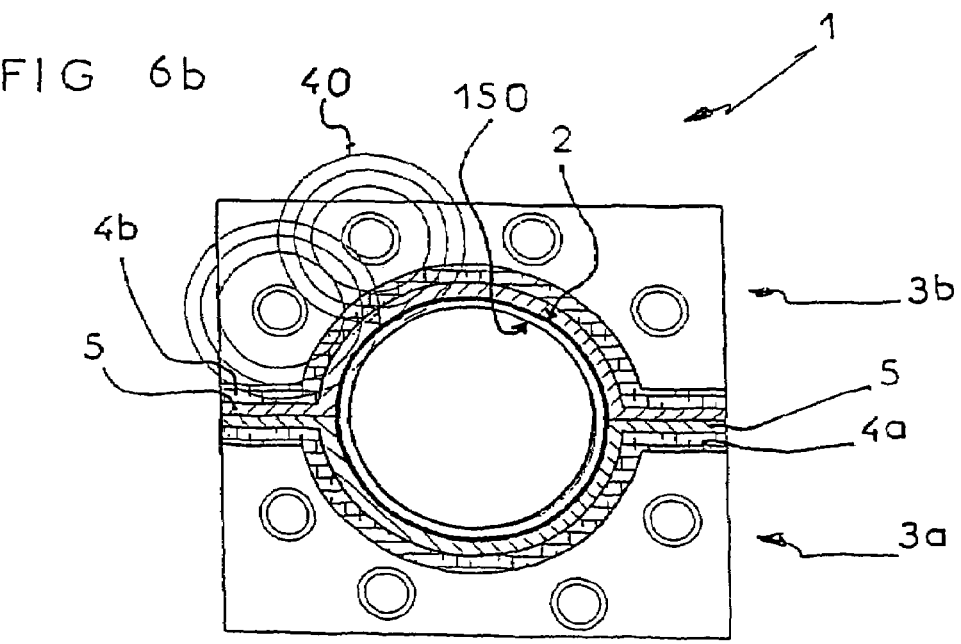

MOULDS FOR TRANSFORMING PLASTIC AND COMPOSITE MATERIALS AND RELATED TRANSFORMATION METHOD

CROSS-REFERENCE TO RELATED APPLICATIONS

The present application is a National Stage Application of International Application No. PCT/FR01/03460, filed Nov. 7, 2001. Further, the present application claims priority under 35 U.S.C. § 119 of French Patent Application No. 00/14324 filed on Nov. 8, 2000.

BACKGROUND OF THE INVENTION

1. Field of the Invention

The present invention relates to molds adapted to transforming plastic and composite materials, and the related transformation methods.

2. Discussion of Background Information

In the transformation of plastic and composite materials, and namely the transformation of reinforced or non-reinforced thermoplastic or thermosetting polymers, as well as vulcanizable compounds, there are numerous methods that consist of heating the material within a mold while pressurizing it, so that it can polymerize while taking on the mold impression. These transformation methods generally use the thermal conduction of the molds to bring the material to the temperature desired for its polymerization. Thus, the molds used are made from materials that conduct heat, on the one hand, and that withstand the temperature at which one wishes to heat the material, on the other hand.

The molds used in the prior art are therefore of two types: metal molds that conduct heat well and that easily withstand the high temperatures, and composite molds that only allow working at relatively low temperatures and with which one can only work certain plastic or composite materials that have low transformation temperatures. These various molds from the prior art have numerous drawbacks related to their implementation and to their use.

Metal molds are very expensive and require heavy investments. In addition, they rise in temperature and therefore cause problems in handling the demolded elements, problems in cooling and heating the elements and the molds, and therefore problems related to the cycle times. Also, the necessity of heating the entire mold requires a very substantial use of energy, particularly in the case of large sized elements. Composite molds are less expensive, but they are made of materials that do not resist high temperatures; therefore, they can only transform plastic and composite materials having a low transformation temperature. In addition, they degrade easily when the temperature rises, and they only allow a number of cycles that is very limited compared to metal molds.

SUMMARY OF THE INVENTION

The present invention aims to resolve the aforementioned drawbacks by arrangements that are simple, easy to implement and inexpensive. It proposes a new generation of composite type molds for transforming plastic and composite materials which allow transforming the material at high temperatures without damaging the molds, and which allow a high number of cycles, while improving the duration of the cycle times, whose length is related to problems of raising the temperature of the molds and of the material. They also allow substantial energy savings compared to traditional metal molds.

In certain cases, these new molds further allow benefiting from a possibility of quick maintenance without requiring the replacement of the entire mold when the impression thereof is damaged.

In this manner, according to its main characteristic, the mold for the transformation of plastic and/or composite materials, such as thermoplastic polymers, thermosetting polymers and vulcanizable compounds, is of the type comprising a mold body provided with an impression, and it is characterized in that it comprises heating system that directly heats the material to be transformed or an intermediary surface impression adjacent to said material, without using the thermal conductivity of the mold body and/or of the impression to heat the material to be transformed.

According to another characteristic of the mold of the invention for transforming plastic and/or composite materials, the impression is constituted of a material that prevents the transfer of calorific energy from the material to the mold body, and vice-versa.

According to embodiments of the mold, the material forming the impression is a mineral resin constituted of the association or combination of non-organic components.

According to another characteristic of the mold of the invention for transforming plastic and/or composite materials, the latter comprises complementary insulating system formed by at least one reflective sheet arranged in the material forming the impression, or between said material and the one forming the mold body.

According to an additional characteristic of the mold of the invention, the latter is characterized in that the heating system is of the electrokinetic or magnetodynamic type, and send an electric current directly or by induction in the material or in the surface impression.

According to embodiments of the mold of the invention for transforming plastic and/or composite materials, the latter comprises a surface impression made of an electrically conductive material and arranged between the material and the impression in order to cover said impression at least partially.

According to these embodiments, the surface impression is made by the electroplating of a metal or of several layers of various metals, by the machining of a metal or an alloy, or by the shaping of a strip made of a forgeable or malleable metal alloy, by the plasma spraying of metals or ceramics, or by the vacuum or chemical vapor phase deposition of metals or ceramics.

According to another characteristic of the mold for transforming plastic and/or composite materials of the invention, it comprises a mold body made of two portions, a lower portion or baseplate that has a recessed impression and an upper portion or punch that has an impression in relief.

According to an additional characteristic of the mold of the invention, the latter is characterized in that it comprises a device for pressurizing the material to be transformed which has a flexible membrane.

According to an embodiment of the mold for transforming plastic and/or composite materials, the membrane is arranged about the impression in relief in order to be pressurized due to a system for circulating air.

According to this embodiment, the membrane is made of silicone, fluoroelastomer, or any other extensible material that resists high temperatures.

According to an additional characteristic of the mold of the invention, the latter is characterized in that it has a system for cooling the material.

According to an embodiment of the mold for transforming plastic and/or composite materials, the cooling system is at least partially formed by the pressurizing device that allows the circulation of fresh air between the impression and the membrane.

Furthermore, the mold for transforming plastic and/or composite materials can comprise complementary cooling system that separates the surface impression and/or the material from the mold impression in order to allow the circulation of fresh air therebetween.

According to another characteristic of the mold of the invention, the latter is characterized in that the mold body is made of cast resin.

In addition, the invention also relates to a method for transforming plastic or composite materials that is characterized in that it comprises a main stage which includes directly heating in a mold the material or a surface impression adjacent thereto without using the thermal conductivity of the mold body.

The invention also provides for a mold for transforming a material comprising a plastic and/or a composite material, the mold comprising a mold body comprising at least one impression arrangement. A heating arrangement directly heats at least one of the material and an intermediary surface impression arranged adjacent to the material. The at least one impression arrangement comprises an insulating material that prevents transfer of calorific energy from the material to the mold body, and vice-versa. The insulating material comprises a mineral resin which includes an association of non-organic constituents. An insulating device is arranged one of within the insulating material and between the insulating material and the mold body.

The plastic and/or composite material may comprise one of a thermoplastic polymer, a thermosetting polymer, and a vulcanizable compound. The insulating device may comprise at least one reflective sheet. The heating arrangement may comprise one of an electrokinetic heating arrangement and a magnetodynamic heating arrangement. The heating arrangement may be configured to send an electric current directly through the material. The heating arrangement may be configured to send an electric current by induction through the material. The heating arrangement may be configured to send an electric current directly through the intermediary surface impression. The heating arrangement may be configured to send an electric current by induction through the intermediary surface impression.

The intermediary surface impression may be made of an electrically conductive material and is arranged between the material and the impression arrangement, wherein the intermediary surface impression at least covers the at least one impression arrangement. The intermediary surface impression may be made of an electrically conductive material and is arranged between the material and the impression arrangement, wherein the intermediary surface impression at least covers the at least one impression arrangement. The intermediary surface impression may be formed by electroplating at least one metal layer. The at least one metal layer may comprise several layers of various metals. The intermediary surface impression may be formed by machining one of a metal and an metal alloy. The intermediary surface impression may comprise a strip of one of a forgeable metal alloy and a malleable metal alloy. The intermediary surface impression may be formed by plasma spraying one of a metal and a conductive ceramic. The intermediary surface impression may be formed by one of vacuum vapor phase deposition and chemical vapor phase deposition.

The mold body may comprise a first portion and a second portion, the first portion comprising a recessed impression which forms part of the impression arrangement and the second portion comprising a relief impression which forms another part of the impression arrangement. The first portion may comprise a lower portion and the second portion may comprise an upper portion. The first portion may comprise a baseplate and the second portion may comprise a punch.

The mold may further comprise a device for pressurizing the material. The device for pressurizing the material may comprise a flexible membrane. The flexible membrane may be arranged to cover the relief impression. The mold may further comprise an arrangement for circulating air within the relief impression, wherein the arrangement for circulating air pressurizes the flexible membrane. The flexible membrane may be made of one of silicone, fluoroelastomer, and an extensible material. The flexible membrane may comprise a material which can withstand high temperatures. The mold may further comprise an arrangement for cooling the material. The arrangement for cooling the material may comprise a flexible membrane and a circulation system which circulates fresh air between the relief impression and the flexible membrane. The arrangement for cooling the material may comprise a circulation system which circulates fresh air in order to cool the recessed impression. The mold body may be made of cast resin.

The invention also provides for a method of transforming a material comprising a plastic and/or a composite material, wherein the method comprises providing a mold body which includes at least one impression arrangement and a heating arrangement and directly heating, in the mold, at least one of the material and a surface of the impression arrangement. The directly heating occurs without using a thermal conductivity of the mold body.

The invention also provides for a mold for transforming a material comprising a plastic and/or a composite material, wherein the mold comprises a mold body comprising a first portion and a second portion, an insulating material arranged on each of the first and second portions, the insulating material of the first portion comprising a recessed impression, the insulating material of the second portion comprising a relief impression, each insulating material being configured to prevent transfer of calorific energy from the material to the mold body, and vice-versa, a heating system arranged in the mold body, and the heating system being configured to directly heat the material.

The mold may further comprise an intermediary device having a surface impression and being arranged adjacent to the material and an insulating device arranged within at least one insulating material. The mold may further comprise an intermediary device having a surface impression and being arranged adjacent to the material and an insulating device arranged between at least one insulating material and the mold body. The invention also provides for a method of transforming a material using the mold described above, wherein the method comprises directly heating, in the mold, the material, wherein the directly heating occurs without using a thermal conductivity of the mold body.

The invention also provides for a mold for transforming a material comprising a plastic and/or a composite material, wherein the mold comprises a mold body comprising a first portion and a second portion, an insulating material arranged on each of the first and second portions, the insulating material of the first portion comprising a recessed impression, the insulating material of the second portion comprising a recessed impression, each insulating material being configured to prevent transfer of calorific energy from the material to the mold body, and vice-versa, a heating system arranged in one of the first and second portions of the mold body, and the heating system being configured to directly heat the material.

The mold may further comprise an intermediary device having a surface impression and being arranged adjacent to the material and an insulating device arranged within at least one insulating material. The mold may further comprise an intermediary device having a surface impression and being arranged adjacent to the material and an insulating device arranged between at least one insulating material and one of the first and second portions of the mold body. The invention also provides for a method of transforming a material using the mold described above, wherein the method comprises directly heating, in the mold, the material, wherein the directly heating occurs without using a thermal conductivity of the mold body.

Other characteristics and advantages of the invention will become apparent from the following description, with reference to the attached drawings that are given only as non-limiting examples.

BRIEF DESCRIPTION OF THE DRAWINGS

FIGS. 1-8 show various molds of the invention as well as their method of use wherein:

FIG. 1 shows a mold in perspective;

FIGS. 2a-2d schematically show a complete cycle of transforming a material in a mold of the invention;

FIG. 2a shows the heating stage;

FIG. 2b shows the pressurizing stage;

FIG. 2c shows the cooling stage;

FIG. 2d shows the demolding of the element obtained;

FIG. 5 shows in perspective a second embodiment of a mold of the invention;

FIGS. 6a-6d show in a transverse cross-section the different stages of a molding method of the invention, the positioning, the heating, the temperature control and the cooling, respectively;

FIG. 8 shows in perspective an alternative construction of the mold of the invention.

DETAILED DESCRIPTION OF THE INVENTION

Figure 1:
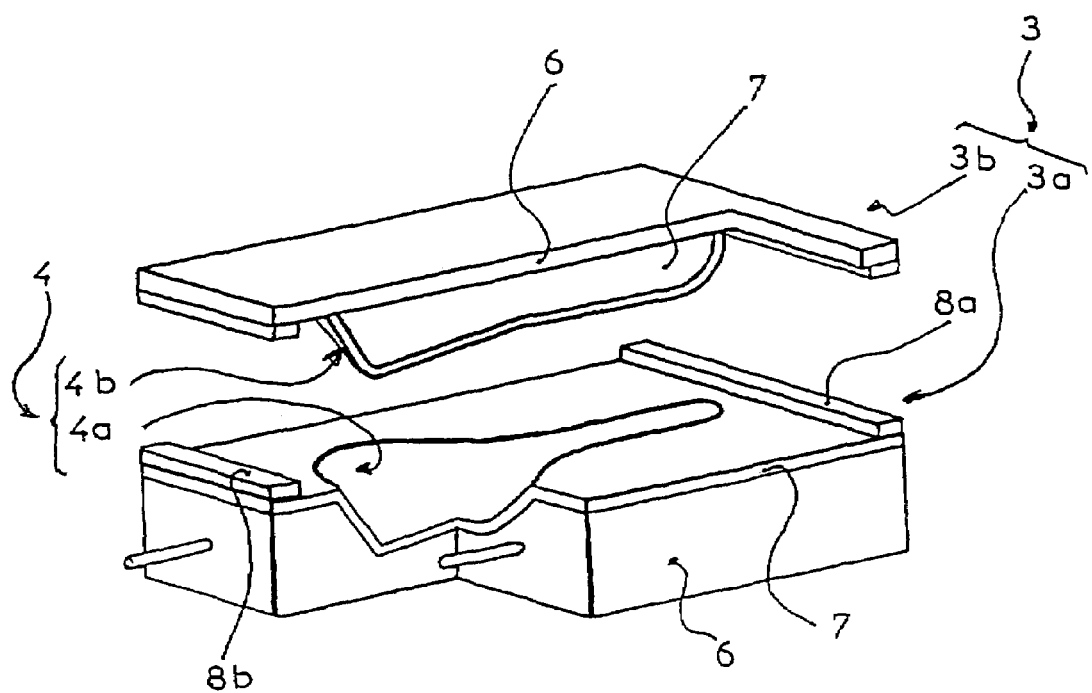

The present invention relates to a new generation of molds adapted to transforming plastic and composite materials. This new generation of molds is adapted to transforming all thermoplastic polymers, such as polypropylene, polyethylene, polyamides, and all thermosetting polymers, such as epoxy and polyester, for example. Naturally, these polymers can be reinforced or non-reinforced with short, long or continuous carbon fibers, glass fibers, aramid, metallic, mineral or vegetable fibers. In addition, it also allows the transformation of vulcanizable compounds, such as rubber, for instance. All of these plastic and composite materials that are capable of being transformed can be in several forms, such as, for example, in the form of fabrics or layers, in the form of tubular braids, or even in the form of powders or granulates, without leaving the scope of protection of the invention. These molds, generally designated by the reference numeral 1, have a heating system or arrangement adapted to heat the plastic and/or composite material 2 to be transformed to the temperature desired. They are constituted of a mold body 3 that has an impression 4 in which the plastic and/or composite material 2 is arranged.

According to the invention, the heating system or arrangement MC directly heat the material 2 to be transformed 2 or an intermediary surface impression 5 located at the interface between the material 2 to be transformed and the impression 4 of the mold body 3 without using the thermal conductivity of the mold body 3 and/or of the impression 4.

Thus, contrary to the metallic and composite molds of the prior art which heat the material 2 by heating the mold body 3 that then transfers its heat to the material 2 by thermal conduction, the molds of the invention have a heating system or arrangement MC that only heats the material or an intermediary surface impression 5 that is in direct contact with the material, without using the thermal conduction of the mold body.

To this end, according to a first embodiment, the heating system or arrangement MC is of the electrokinetic type, with Joule effect, for example, as shown in FIGS. 2a-2d, and provide for directly sending an electric current through the plastic or composite material if the latter is electrically conductive, or through an intermediary surface impression 5 if the material 2 is not conductive, said impression being made of an electrically conductive material. The circulation of the current causes the heating of the material 2 or of the impression 5 adjacent thereto due to the resistance of the material or of the impression, but in no way acts on the mold body 3.

According to other embodiments of the molds shown in FIGS. 3a-4d, the electric current circulating in the material 2 or in the surface impression 5 is a current induced by magnetic fields 40, and the heating system or arrangement MC is of the magnetodynamic or induction type, the current induced acting similarly to the first embodiment in order to cause the heating of the material 2 or of the surface impression 5.

According to the first embodiment of the molds and its variants, shown in FIGS. 1-4d, the latter are formed by a mold body 3 made of two portions: a lower portion 3a or lower baseplate that has a recessed impression 4a, and an upper portion 3b, also called a punch, that has an upper impression 4b in relief, the upper and lower impressions forming the impression 4 of the mold.

According to a second embodiment shown in FIGS. 5-8, the molds 1 are adapted to make hollow sections and have a mold body 3 made of one or several portions 3a, 3b that each have recessed impressions 4a, 4b defining the outer form of the section. According to this embodiment, the mold 1 uses an inner inflatable flexible envelope or lining 150 in order to make the inside of the section, as known and as shown in FIGS. 6a-7d.

Once the plastic and/or composite material 2 is arranged in the lower impression 4a, the mold is closed and the lower 4a and upper 4b impressions define the final form that the material 2 will take on during its transformation.

According to the invention, the lower and upper 4a, 4b impressions are constituted of a material adapted to avoid the transfer of heat from the material 2 to the mold body 3, 3a, 3b itself, and vice-versa. Thus, the baseplate 3a and the punch 3b, or both parts of the mold for hollow sections 3a, 3b, have a base made of a rigid plastic and/or composite material, such as a cast resin 6, and they comprise on their opposing surfaces an impression 4a, 4b made of a thermally insulating material 7, such as, for example, mineral resin, this material being arranged to form a layer that prevents the transfer of thermal energy, i.e., in order to form a thermal barrier or shield.

Furthermore, in certain variants not shown, complementary thermal insulating arrangements can be provided. These arrangements can be advantageously obtained by adding reflective sheets comprising a silver coating, or mica, for example, said sheets being capable of being arranged inside of the insulating material 7 or between said material and the one forming the mold body itself.

Thus, when the material 2 and/or the surface impression 5 located between the mold impressions 4a, 4b is/are directly heated by the heating system or arrangement MC, the impressions 4a, 4b insulate the respective bodies or bases of the baseplate 3a and of the punch 3b that are only slightly heated, or even not heated at all. As a result, these bases 3a, 3b can be made of a common composite material, such as epoxy resin 6, without being damaged during the transformation cycles, even when the material 2 is transformed at high temperatures (greater than 150° C.). The molds of the invention are therefore of the composite type but, contrary to the composite molds from the prior art that could only transform materials of the thermosetting type at maximum temperatures of 130° C., they can perform the transformation at high temperatures without being damaged, particularly due to their impression 4a, 4b made of a thermally insulating material 7 and to the heating system or arrangement MC that directly heats the material 2 or a surface impression 5.

According to the preferred embodiment of the invention, the impressions 4a, 4b are made of mineral resin constituted of the association or combination of non-organic constituents, according to several possible methods (polyaddition, polycondensation, sintering, curing, etc.), and are, for example, made of inorganic ceramic resulting from a polycondensation of at least one mineral resin, such as those marketed under the trademarks FIXWOOL (PS4, EZG, AL) or GÉOPOLYMÈRE. These mineral resins can additionally contain fillers (carbon, stainless fibers, alumosilicate) or other additives. When the plastic and/or composite material 2 to be transformed is electrically conductive, the molds 1 have no intermediary surface impression 5, as shown in FIGS. 2a-3d and 7a-7d. However, when the material 2 is not conductive, an electrically conductive surface impression 5 is provided in the mold which is adapted to be heated in order to transmit its heat to the plastic material 2 adjacent thereto by thermal conduction, as shown in FIGS. 4a-4d, 5 and 6a-6d.

According to the preferred embodiments of the molds, this intermediary surface impression 5 can be obtained by the electroplating of a metal or of several layers of various metals, or by the shaping of a strip made of a forgeable or malleable metal alloy having a thickness comprised between 0.01 mm and 5 mm, for example. It could also be obtained by the machining of steel, alloy or any other metal, without leaving the scope of protection of the invention. It can also be obtained by the heat (plasma) spraying of metals or conductive ceramics, or by the vacuum or chemical vapor phase deposition of metals or ceramics.

According to the first embodiment shown in FIGS. 1-2d, the system or arrangement MC for heating the mold 1 is formed by electric copper contacts 8a, 8b that allow passing an electric current directly through the material 2 to be transformed. In the second and third embodiments shown in FIGS. 3a-4d, the heating system or arrangement is formed by inductors (i.e., 9, 9a, 9b, etc.) that, through the application of magnetic fields 40, cause the circulation of an electric current in the material 2 or in a surface impression 5 in order to heat them.

Additionally, according to this first embodiment, the mold 1 has a device for pressurizing the material 2 adapted to be implemented during the heating cycle in order to obtain an even transformation of the material 2 by imparting homogeneous pressure and temperature constraints thereto, regardless of the form of the element to be made and therefore of the impression 4a, 4b.

According to the first preferred embodiment of the molds 1, the pressurizing device is formed by a flexible membrane 10 and by a system (i.e., 11, 12a, 12b) for circulating air, namely adapted to inflate said membrane 10. The membrane 10 is advantageously fixed about the impression 4b in relief of the punch 3b in order to be able to be pressurized by thus taking on the form of the impression. In this manner, it subjects the plastic material 2 to be transformed to the desired pressure in a homogeneous manner throughout the impression, regardless of the form of the impression and therefore of the element to be made. The pressurizing system is advantageously formed by one or several pressurizing chambers 11 located in the body of the punch 3b and provided with pressurizing and circulating channels 12a, 12b that connect the chambers to the surface of the impression 4b in relief that the membrane 10 envelops.

Figure 2A:
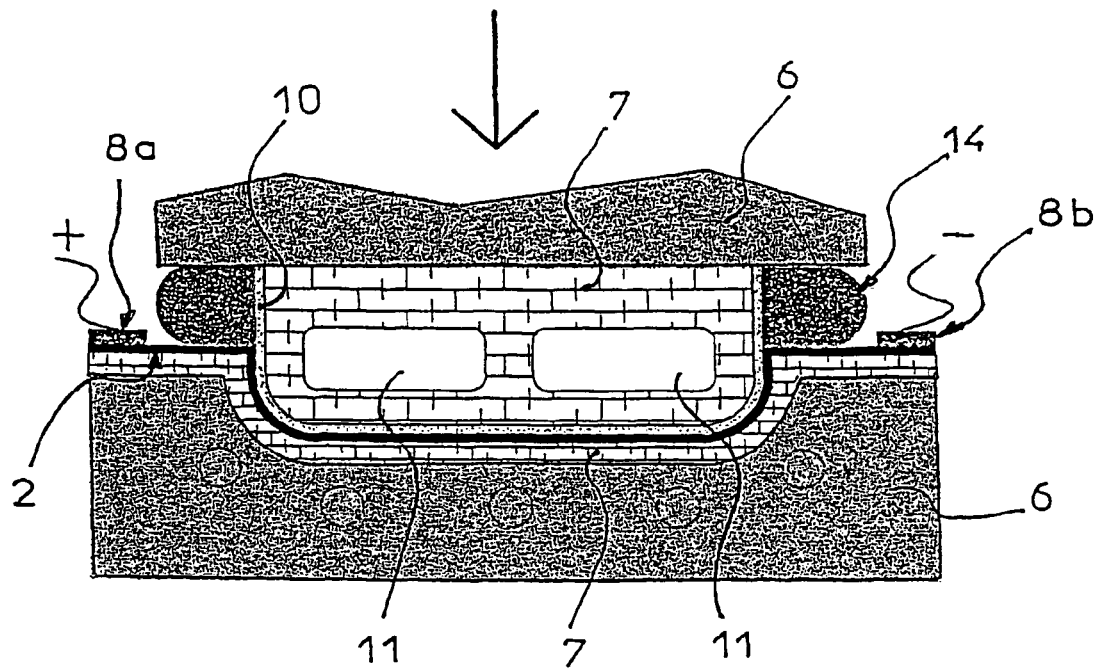
Figure 3A:
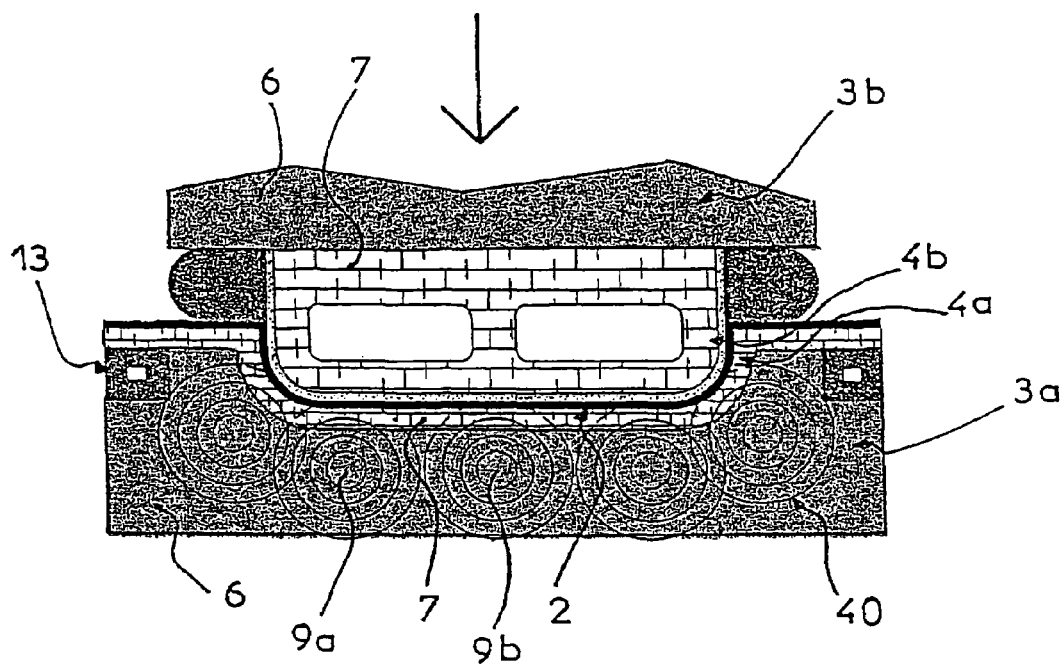
FIGS. 3a-3d and 4a-4d show, in similar views, the transformation cycle with two other alternative molds of the invention.
Figure 3B:
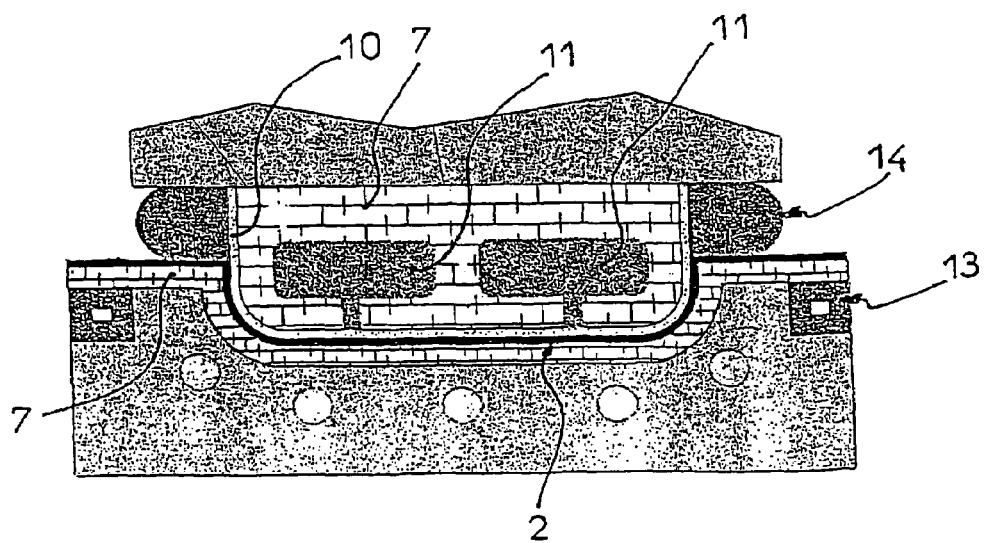
Figure 3C:
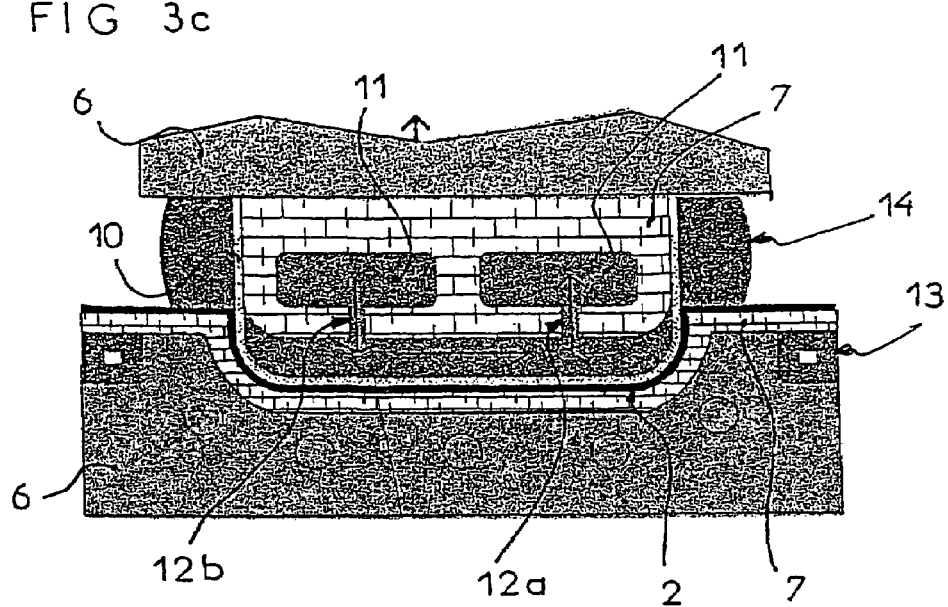
Figure 3D:
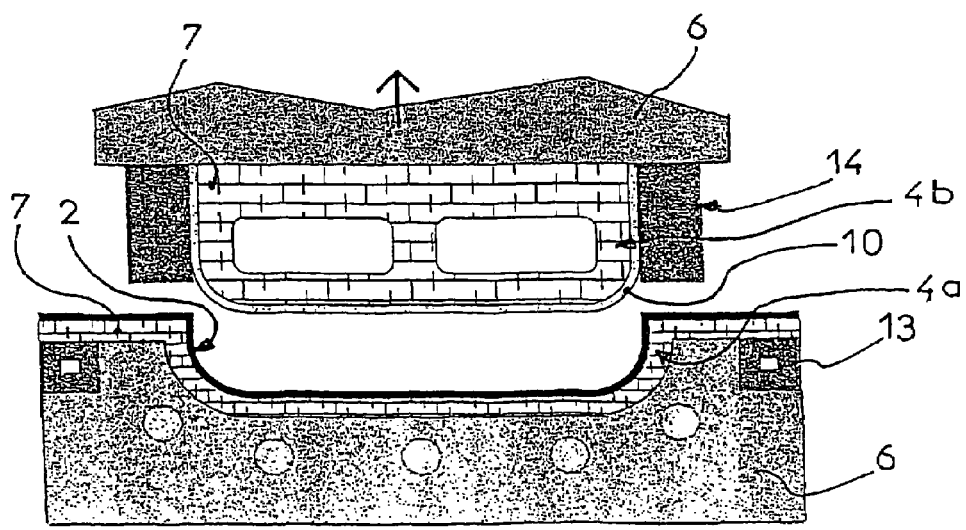
Figure 4A:
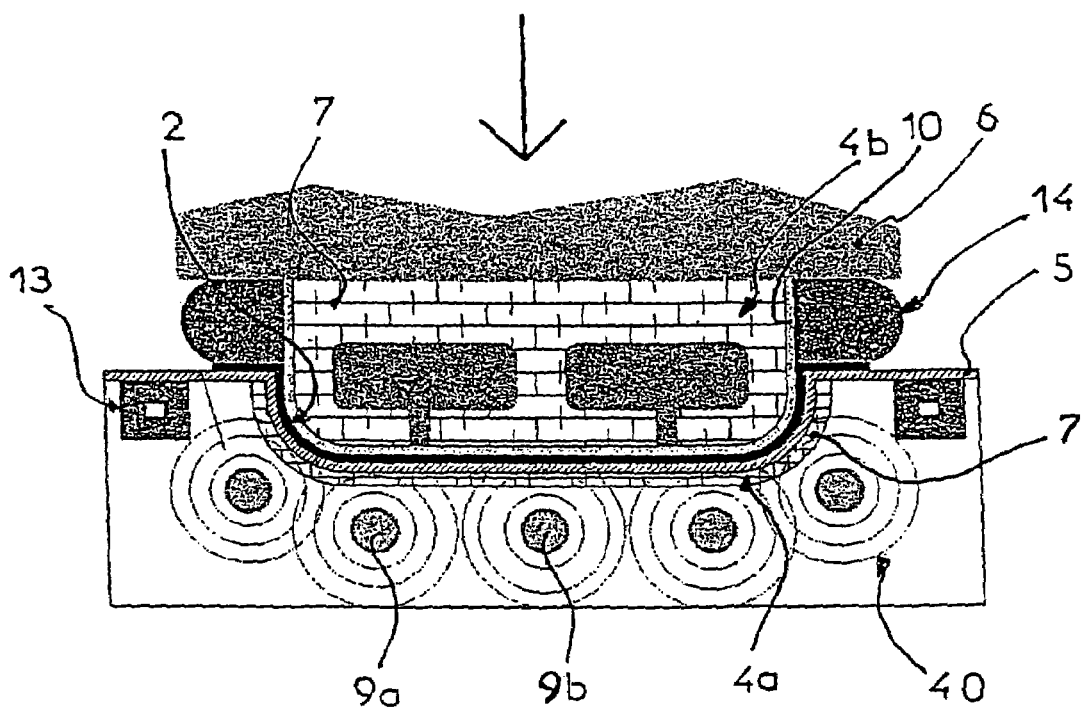
Figure 4B:
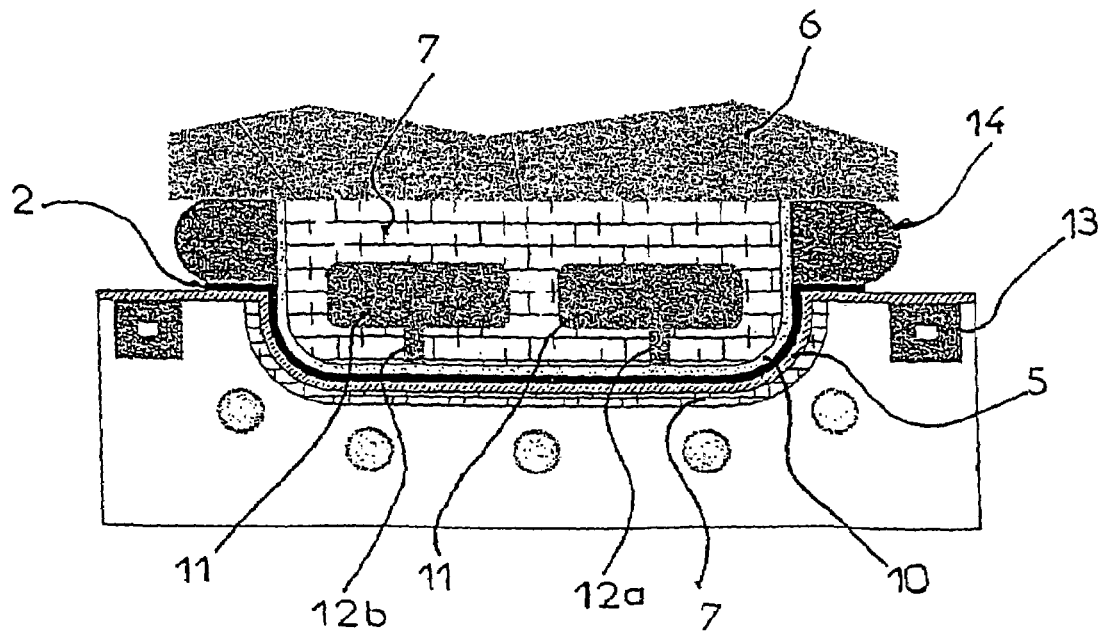
Figure 4C:
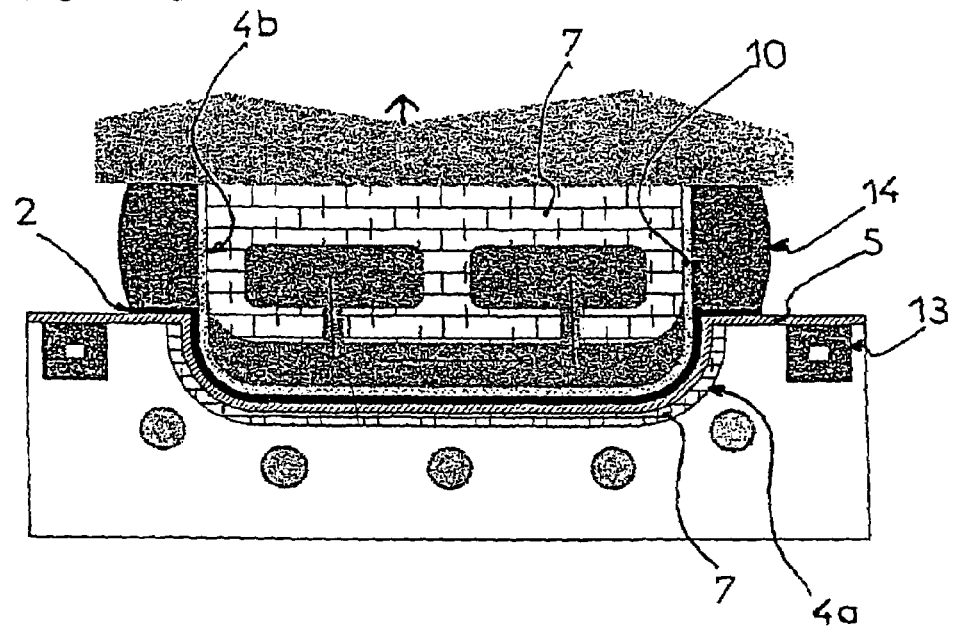

According to another characteristic, the molds 1 have a system for cooling the material 2 adapted to allow the cooling of the plastic and/or composite material elements 2 so as to facilitate the demolding thereof in particular. This cooling system can be at least partially formed by the pressurizing device (i.e., 10, 11, 12a, 12b) that allows, as shown in FIGS. 2c, 3c and 4c, circulating fresh air between the impression 4b of the punch 3b and the membrane 10. This air, that can be selected to be −30° C., for example, allows cooling the material 2 through the membrane 10 and the impression 4b of the punch. Thus, as shown in FIGS. 2c, 3c and 4c, the cooling occurs due to a partial retraction of the punch that, while maintaining the pressure in the membrane 10, allows creating a space between its impression 4b and said membrane so as to circulate cold air therein. One can note that the membrane 10 can advantageously be made of silicone, or of fluoroelastomer, or any other extensible material that resists high temperatures.

It goes without saying that other complementary cooling arrangements 13 and 14 can be provided, namely arrangements that are capable of cooling the surface impression 5, when it is used, and the layer of insulating material 7 of the recessed impression 4a of the baseplate 3a, the surface of which can be slightly heated as the cycles are repeated.

Figure 4D:
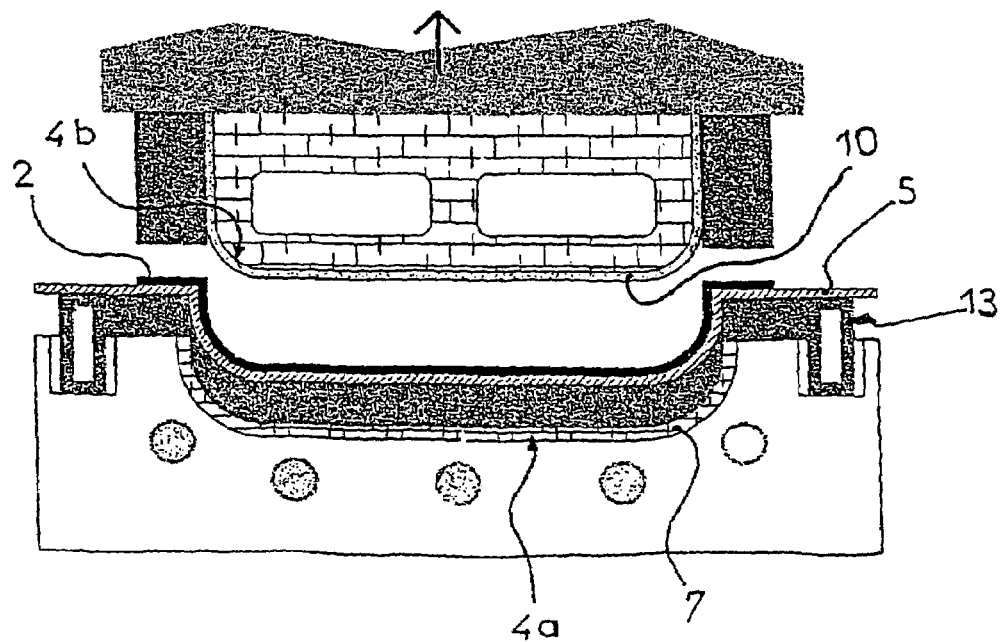
Figure 5:
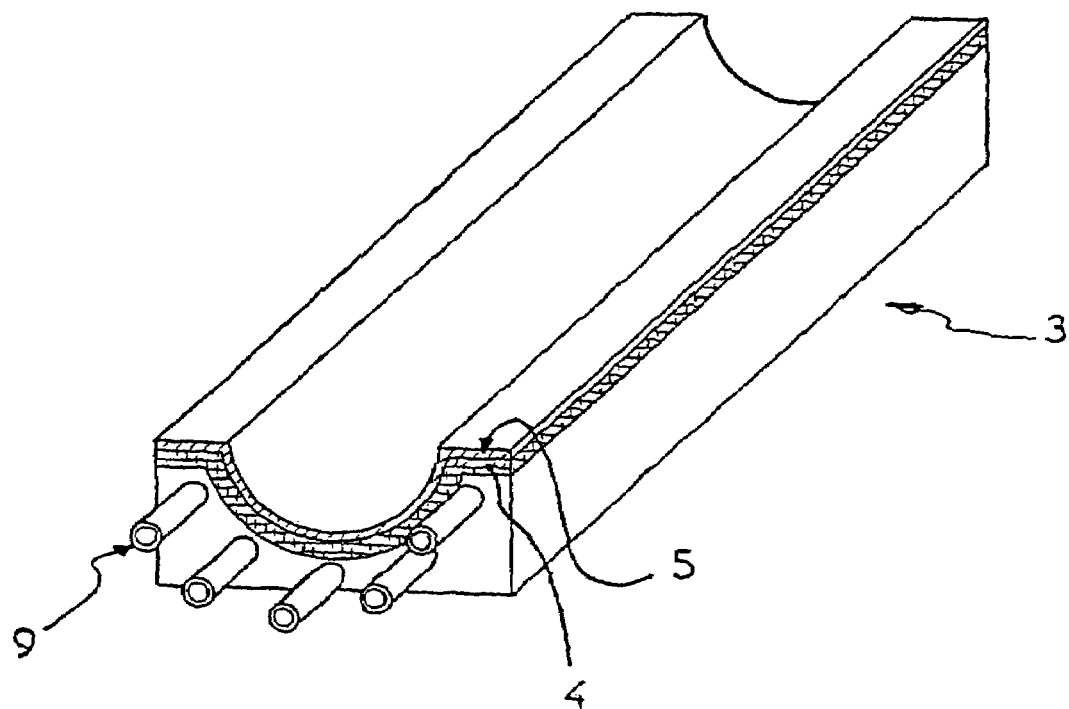

These complementary cooling arrangements are, for example, constituted by a separating device adapted to separate the insulating layer 7 forming the recessed impression 4a of the surface impression 5 or of the transformed material 2 to allow the circulation of cool air therebetween by way of a system for circulating air located in the baseplate 3a, as shown in FIG. 4d. According to an embodiment of the separating device, the latter is, for example, made by an inflatable or elastomeric seal 13 arranged in a groove provided to this end about the recessed impression 4a. Furthermore, an elastomeric frame 14 allows conserving the impermeability of the mold, even during the cooling phase shown in FIGS. 2c, 3c and 4c.

It is understood that to simplify the description, the molds of the invention are described in a simplified diagram in which they are made of two portions, but their form could obviously be complex without leaving the scope of protection of the invention. Likewise, the described heating arrangements that heat the material 2 or the surface impression 5 are of the electrokinetic or magnetodynamic type; however, they can also be of another type.

Figure 6C:
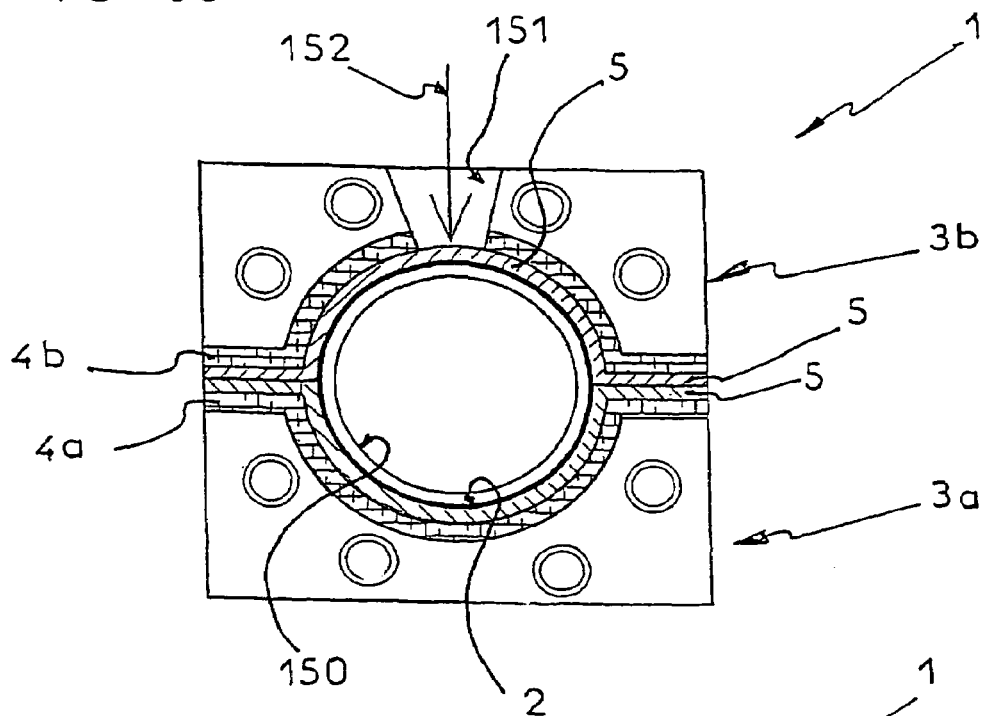
Figure 6D:
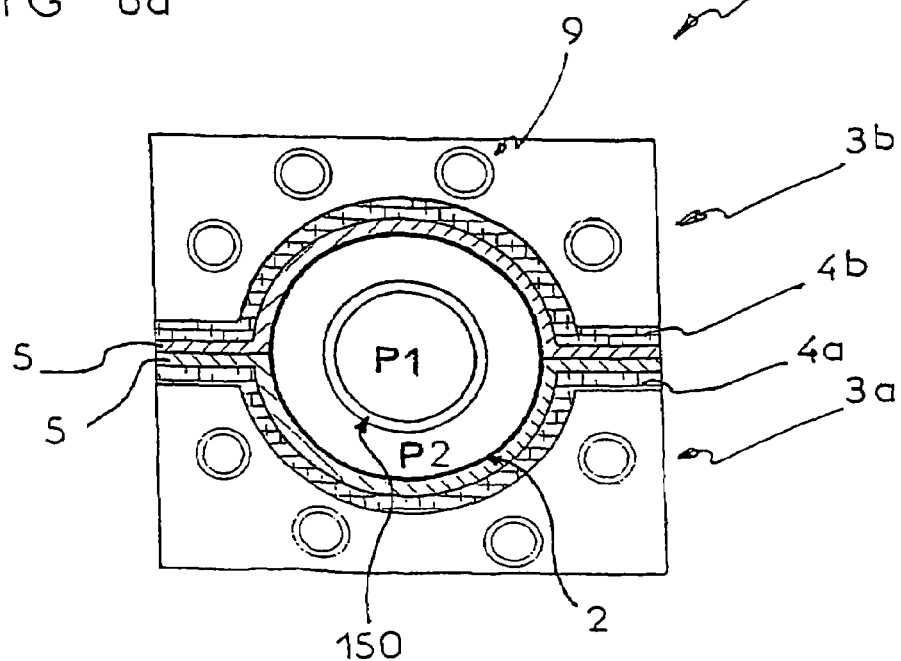
Figure 7A:
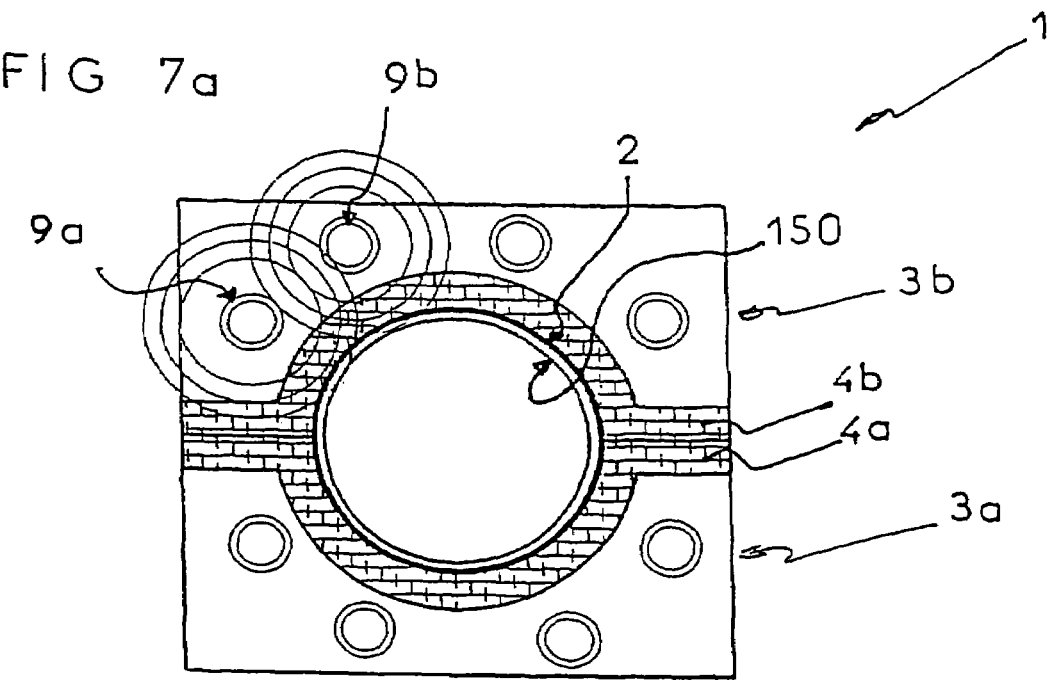
FIGS. 7a-7d show in a transverse cross-section the heating, the temperature control, the cooling and the complementary cooling and demolding stage of the method of the invention.
Figure 7B:
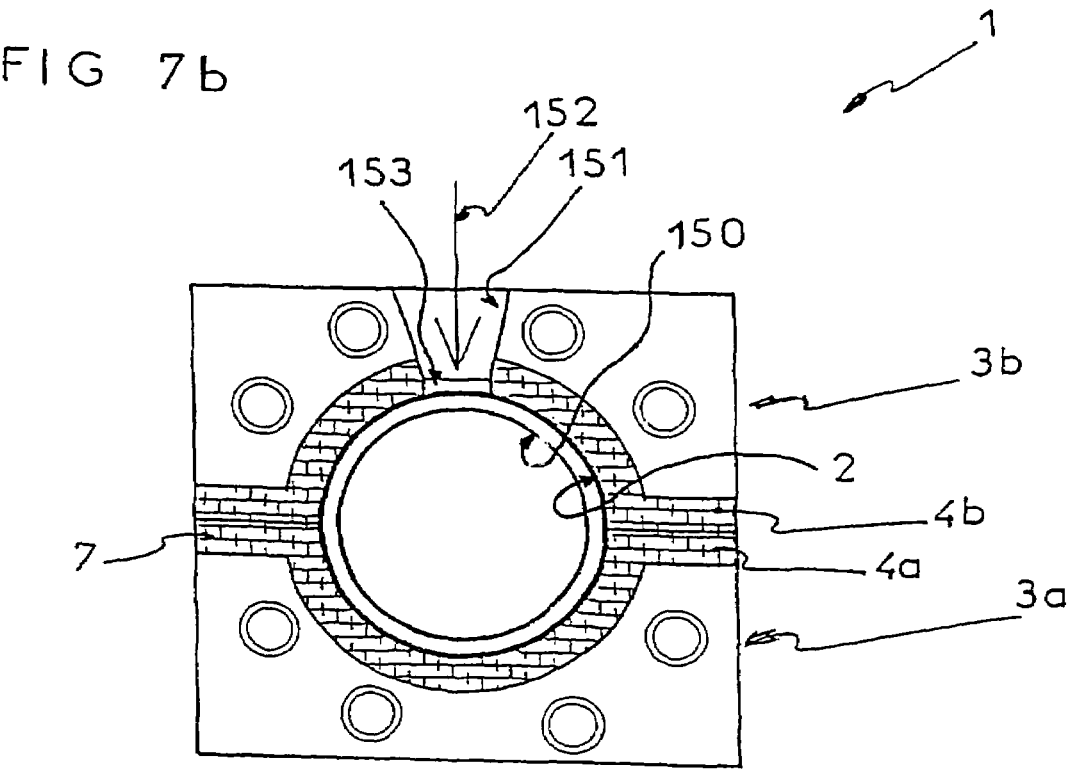
Figure 7C:
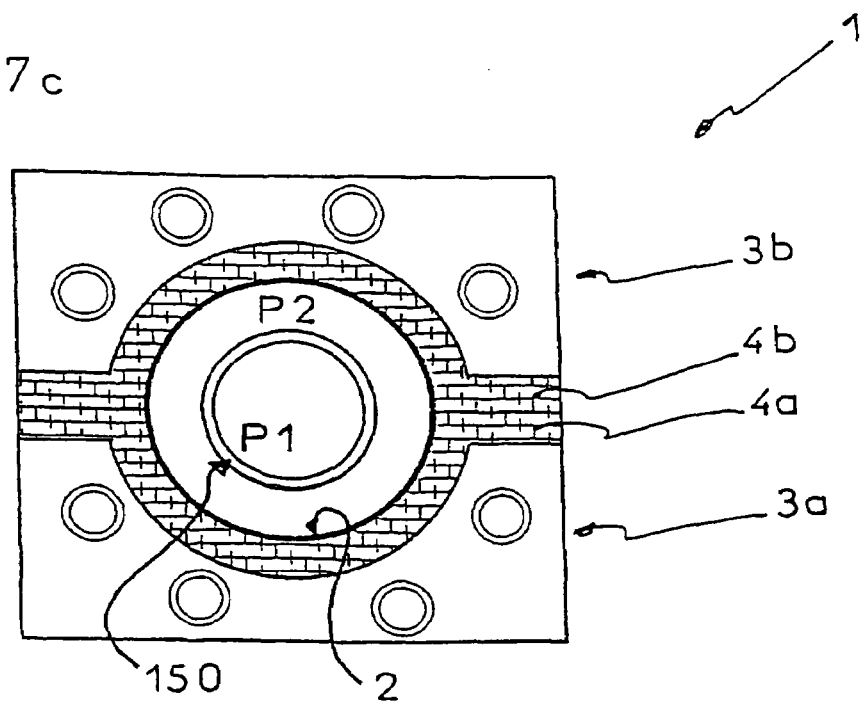
Figure 7D:
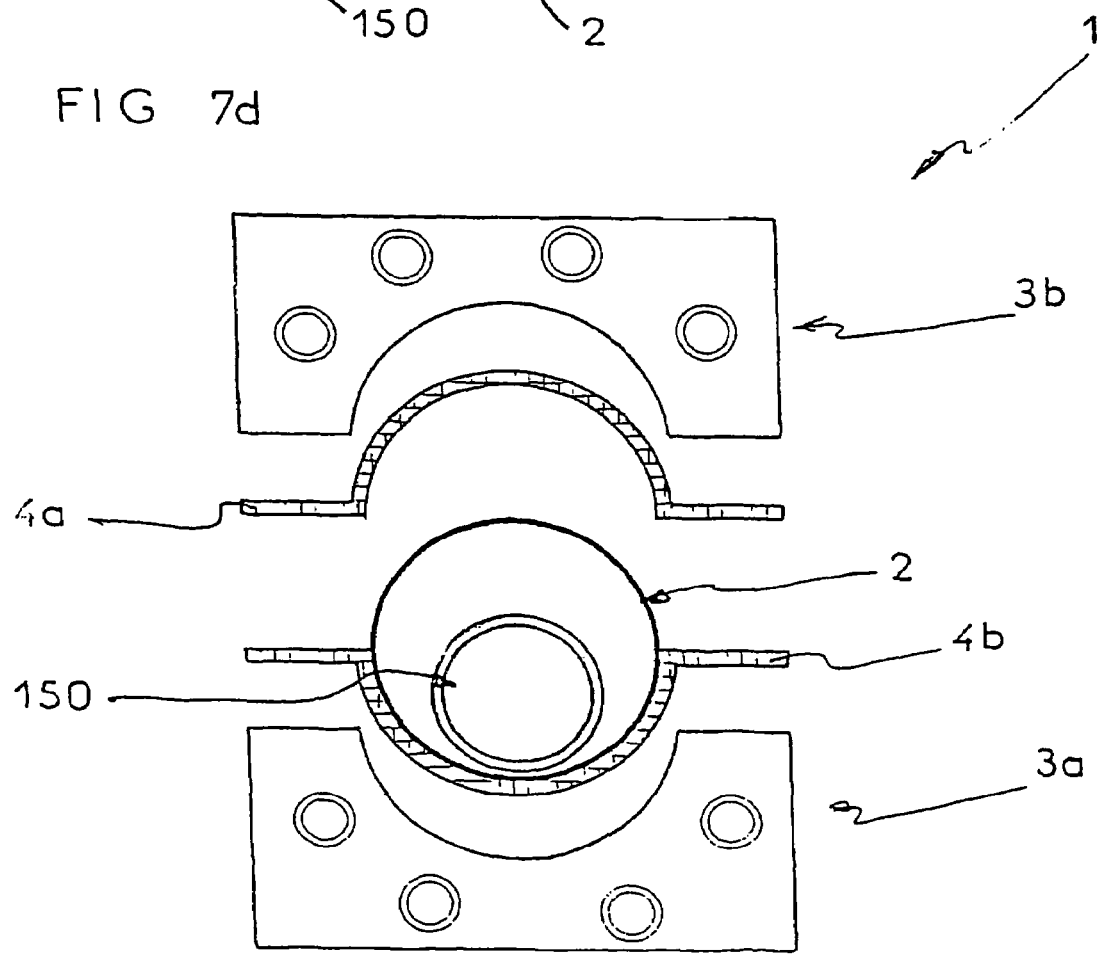
Figure 8:
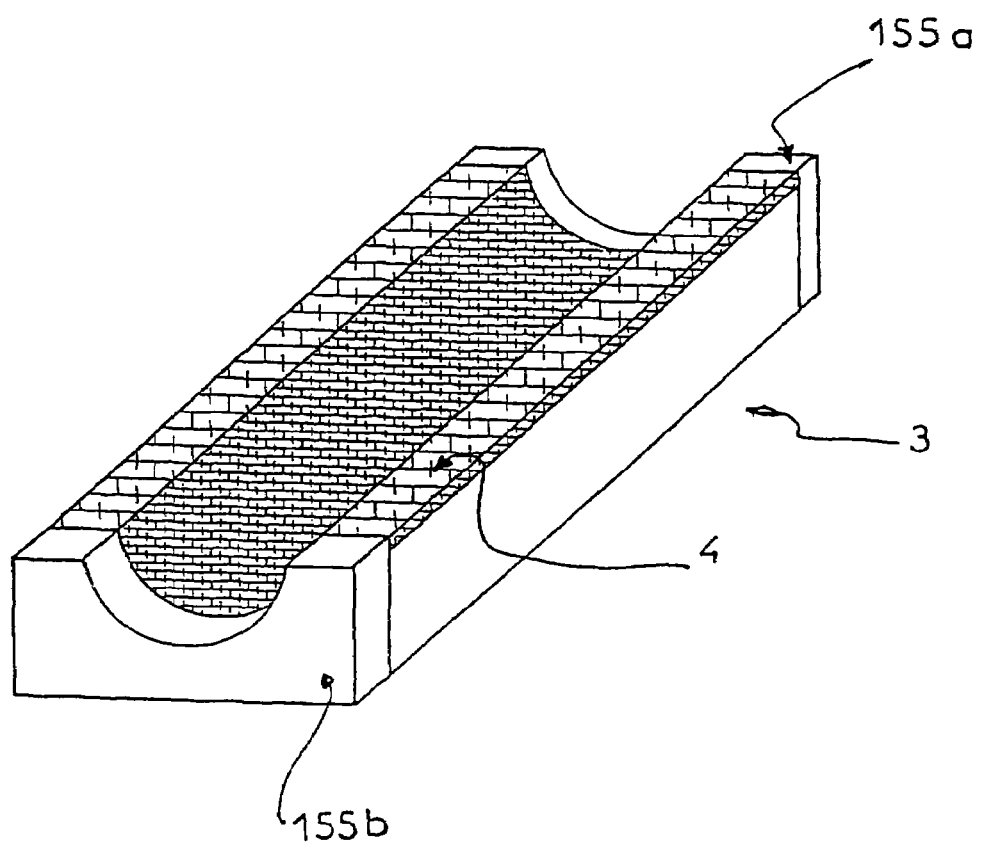

According to a second embodiment and its variants shown in FIGS. 5, 6a-7d and 8, the molds 1 are also provided to make hollow sections. Therefore, they comprises a mold body 3 that is advantageously formed of several elements 3a, 3b, each having a recessed impression 4a, 4b in which the user arranges the material 2. The material 2 is advantageously arranged about an inflatable envelope or lining 150 called a goldbeater's skin, and that is pressurized when one heats the material, as shown in FIGS. 6b and 7a. According to this embodiment, the heating system can be of the magnetodynamic type, as shown in FIGS. 6b and 7a, or of the electrokinetic type, as shown in FIG. 8, or other. The molds also comprise an impression 4a, 4b made of a thermally insulating material 7 and have a surface impression 5, depending on the type of material 2 to be transformed (electric conductivity).

FIG. 5 and FIGS. 6a-7d show a mold 1 using magnetodynamic heating system formed by inductors 9a, 9b. A first variant shows the transformation of a non-electrically conductive material (FIGS. 5, 6a-6d) due to the surface impression 5, and a second variant shows the transformation of a conductive material 2 in FIGS. 7a-7d. One can note that in these embodiments, the cooling system is obtained due to a device for circulating fresh air that allows establishing an air circulation at a pressure P2 that is greater than the pressure P1 that exists in the goldbeater's skin 150, as shown in FIGS. 6d and 7c. One can also note that the complementary cooling arrangement that is not shown could also allow the cooling of the surface impression 5 and/or of the outer surface of the insulating layers 4a, 4b by separating them from the mold body, as shown in FIG. 7d.

According to the invention, the layers 4a, 4b of insulating material 7 and the mold body 3, 3a, 3b are assembled by any type of binding, such as gluing or mechanical fasteners of the insert type. These binding arrangements can also allow the attachment of the surface impression 5.

Furthermore, it is important to note that the molds 1 can be equipped with a system for controlling the temperature that are capable of precisely measuring or evaluating the temperature of the material 2 and/or of the surface impression 5. This system can utilize a measuring orifice 151 that is advantageously conical, in which a laser-sighted apparatus 152 performs an infrared measurement directly on the surface impression 5, as shown in FIG. 6c, or on a tab of material having a high thermal conductivity 153, such as a mineral resin loaded with a copper-beryllium alloy, for example, as shown in FIG. 7b. However, these control arrangements could be obtained differently, for example, according to the variant shown in FIG. 8, in which the heating system is of the electrokinetic type, formed by electric contacts mounted on copper blocks 155a, 155b located at the ends of the semi-cylindrical mold portions, the control can occur due to the measurement of intensity of the electric current crossing through the material, said intensity being dependent on the temperature of the material.

Figure 2B:
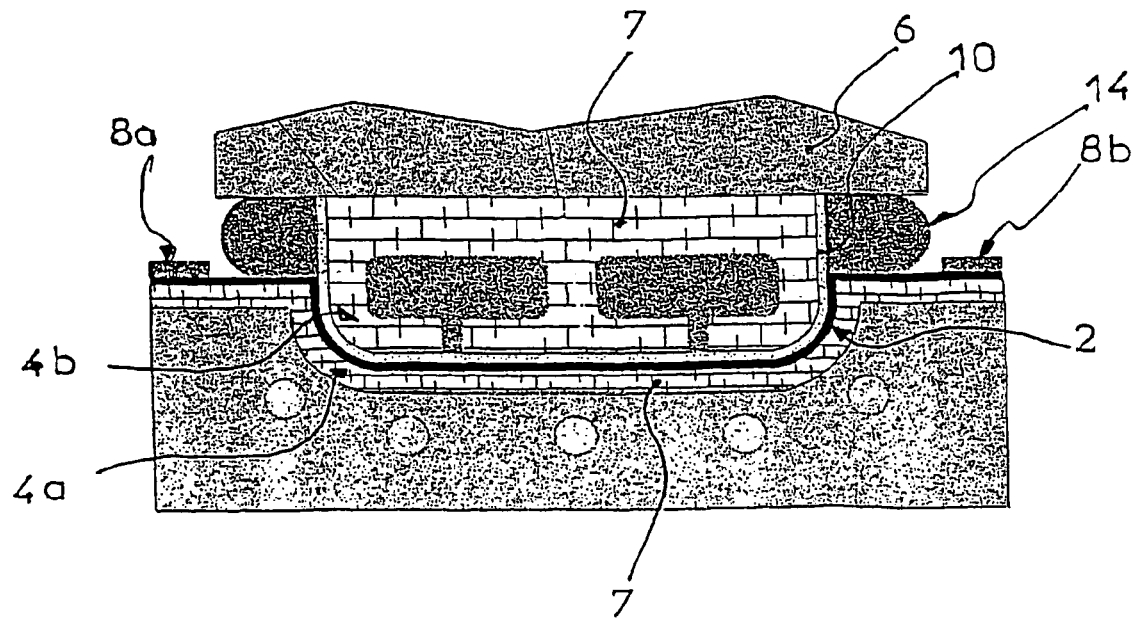

Furthermore, the invention also relates to a method for transforming plastic and/or composite materials, such as thermoplastic or thermosetting polymers, or vulcanizable compounds, associated with the previously described molds 1. In a main step shown in FIGS. 2a, 3a, 4a, this method includes directly heating the material 2 to be transformed or a surface impression 5, without using the thermal conductivity of the mold body. In addition, this method also comprises a complementary step for pressurizing the material, due to the inflatable membrane arrangement 10, 11, 12a, 12b, as shown in FIGS. 2b, 3b and 4b, followed by a phase for cooling the material 2 by circulating cold air, as shown in FIGS. 2c, 3c and 4c, and a demolding step shown in FIGS. 2d and 3d. This demolding phase can also be accompanied by a complementary step for cooling the surface impression 5, as shown in FIG. 4d.

Also, one can note that the surface impression 5 and/or the impressions 4, 4a, 4b made of material forming a thermal barrier 7 can be removably arranged in the mold 1 by way of an adapted attachment arrangement so as to be replaced when they are damaged or worn out without replacing the entire mold body 3, 3a, 3b.

Naturally, the invention is not limited to the embodiments described and shown by way of examples, but it also includes all of the technical equivalents as well as their combinations.

The invention claimed is:

1. A mold for transforming a material comprising at least one of a plastic and a composite material, the mold comprising:
   a cooling system for cooling the material in the mold;
   a mold body comprising one of a rigid plastic material and a composite material and including at least one impression arrangement;
   a heating arrangement which directly heats at least one of:
      the material; and
      an intermediary surface impression arranged adjacent to the material;
   the at least one impression arrangement comprising an insulating material that prevents transfer of calorific energy from the material to the mold body, and vice-versa;
   the insulating material comprising a mineral resin which includes an association of non-organic constituents;
   a flexible pressurizing device structured and arranged to exert pressure on the material being molded; and
   an insulating device arranged one of:
      within the insulating material; and
      between the insulating material and the mold body.

2. The mold of claim 1, wherein the plastic and/or composite material that is transformed comprises one of a thermoplastic polymer, a thermosetting polymer, and a vulcanizable compound.

3. The mold of claim 1, wherein the insulating device comprises at least one reflective sheet.

4. The mold of claim 1, wherein the heating arrangement comprises one of an electrokinetic heating arrangement and a magnetodynamic heating arrangement.

5. The mold of claim 1, wherein the heating arrangement is configured to send an electric current directly through the material.

6. The mold of claim 1, wherein the heating arrangement is configured to send an electric current by induction through the material.

7. The mold of claim 1, wherein the heating arrangement is configured to send an electric current directly through the intermediary surface impression.

8. The mold of claim 1, wherein the heating arrangement is configured to send an electric current by induction through the intermediary surface impression.

9. The mold of claim 1, wherein the intermediary surface impression is made of an electrically conductive material and is arranged between the material and the at least one impression arrangement, wherein the intermediary surface impression at least covers the at least one impression arrangement.

10. The mold of claim 1, wherein the cooling system is arranged on an upper mold part and wherein the intermediary surface impression is made of an electrically conductive material and is arranged between the material and the at least one impression arrangement, wherein the intermediary surface impression at least covers the at least one impression arrangement.

11. The mold of claim 10, wherein the intermediary surface impression is formed by electroplating at least one metal layer.

12. The mold of claim 11, wherein the at least one metal layer comprises several layers of various metals.

13. The mold of claim 1, wherein the intermediary surface impression is formed by machining one of a metal and a metal alloy.

14. The mold of claim 1, wherein the intermediary surface impression comprises a strip of one of a forgeable metal alloy and a malleable metal alloy.

15. The mold of claim 1, wherein the intermediary surface impression is formed by plasma spraying one of a metal and a conductive ceramic.

16. The mold of claim 1, wherein the intermediary surface impression is formed by one of vacuum vapor phase deposition and chemical vapor phase deposition.

17. The mold of claim 1, wherein the mold body comprises a first portion and a second portion, the first portion comprising a recessed impression which forms part of the impression arrangement and the second portion comprising a relief impression which forms another part of the impression arrangement.

18. The mold of claim 17, wherein the first portion comprises a lower portion and wherein the second portion comprises an upper portion.

19. The mold of claim 17, wherein the first portion comprises a baseplate and wherein the second portion comprises a punch.

20. The mold of claim 1, wherein the cooling system for cooling the material is arranged in an upper mold and the mold body comprises a lower mold.

21. The mold of claim 1, wherein the cooling system for cooling the material comprises a circulation system which circulates fresh air in order to cool a recessed impression of the at least one impression arrangement.

22. The mold of claim 1, wherein the mold body is made of cast resin.

23. A mold for transforming a material comprising at least one of a plastic and a composite material, the mold comprising:
  a cooling system for cooling the material in the mold;
  a mold body comprising at least one impression arrangement;
  a heating arrangement which directly heats at least one of:
    the material; and
    an intermediary surface impression arranged adjacent to the material;
  the at least one impression arrangement comprising an insulating material that prevents transfer of calorific energy from the material to the mold body, and vice-versa;
  the insulating material comprising a mineral resin which includes an association of non-organic constituents;
  an insulating device arranged one of:
    within the insulating material; and
    between the insulating material and the mold body; and
  a device for pressurizing the material,
  wherein the mold body comprises a first portion and a second portion, the first portion comprising a recessed impression which forms part of the impression arrangement and the second portion comprising a relief impression which forms another part of the impression arrangement, and
  wherein the device for pressurizing the material comprises a flexible membrane.

24. The mold of claim 23, wherein the flexible membrane is arranged to cover the relief impression.

25. The mold of claim 24, wherein the cooling system is an arrangement for circulating air within the relief impression, wherein the arrangement for circulating air pressurizes the flexible membrane.

26. The mold of claim 23, wherein the flexible membrane is made of one of silicone, fluoroelastomer, and an extensible material.

27. The mold of claim 23, wherein the flexible membrane comprises a material which can withstand high temperatures.

28. A mold for transforming a material comprising at least one of a plastic and a composite material, the mold comprising:
  a cooling system for cooling the material in the mold;
  a mold body comprising at least one impression arrangement;
  a heating arrangement which directly heats at least one of:
    the material; and
    an intermediary surface impression arranged adjacent to the material;
  the at least one impression arrangement comprising an insulating material that prevents transfer of calorific energy from the material to the mold body, and vice-versa;
  the insulating material comprising a mineral resin which includes an association of non-organic constituents; and
  an insulating device arranged one of:
    within the insulating material; and
    between the insulating material and the mold body,
  wherein the cooling system for cooling the material comprises a flexible membrane and a circulation system which circulates fresh air between a relief impression and the flexible membrane.

29. A method of transforming a material comprising at least one of a plastic and a composite material, the method comprising:
  providing a mold body comprising one of a rigid plastic material and a composite material and which includes at least one impression arrangement, a flexible pressurizing device structured and arranged to exert pressure on the material being molded, and a heating arrangement;
  directly heating, in the mold body, at least one of the material and a surface of the impression arrangement; and
  cooling the material in the mold body with a cooling system,
  wherein the directly heating occurs without using a thermal conductivity of the mold body.

30. A mold for transforming a material comprising at least one of a plastic and a composite material, the mold comprising:
  a mold system comprising one of a rigid plastic material and a composite material and including a first portion and a second portion;
  an insulating material arranged on each of the first and second portions;
  the insulating material of the first portion comprising a recessed impression;
  the insulating material of the second portion comprising a relief impression;
  each insulating material being configured to prevent transfer of calorific energy from the material to the mold system, and vice-versa;
  a cooling system for cooling the material in the mold system;

a flexible pressurizing device structured and arranged to exert pressure on the material being molded;
a heating system arranged in the mold system; and
the heating system being configured to directly heat the material.

31. The mold of claim 30, further comprising:
an intermediary device having a surface impression and being arranged adjacent to the material; and
an insulating device arranged within at least one insulating material.

32. The mold of claim 30, further comprising:
an intermediary device having a surface impression and being arranged adjacent to the material; and
an insulating device arranged between at least one insulating material and a surface of the mold system.

33. A method of transforming a material using the mold of claim 30, the method comprising:
directly heating, in the mold system, the material,
wherein the directly heating occurs without using a thermal conductivity of the mold system.

34. A mold for transforming a material comprising at least one of a plastic and a composite material, the mold comprising:
a mold comprising one of a rigid plastic material and a composite material and including a first portion and a second portion;
an insulating material arranged on each of the first and second portions;
the insulating material of the first portion comprising a recessed impression;
the insulating material of the second portion comprising a recessed impression;
each insulating material being configured to prevent transfer of calorific energy from the material to the mold, and vice-versa;
a flexible pressurizing device structured and arranged to exert pressure on the material being molded;
a cooling system arranged in the second portion of the mold;
a heating system arranged in the first portion of the mold; and
the heating system being configured to directly heat the material.

35. The mold of claim 34, further comprising:
an intermediary device having a surface impression and being arranged adjacent to the material; and
an insulating device arranged within at least one insulating material.

36. The mold of claim 34, further comprising:
an intermediary device having a surface impression and being arranged adjacent to the material; and
an insulating device arranged between at least one insulating material and one of the first and second portions of the mold.

37. A method of transforming a material using the mold of claim 34, the method comprising:
directly heating, in the mold, the material,
wherein the directly heating occurs without using a thermal conductivity of the mold.

* * * * *